Figure 1:
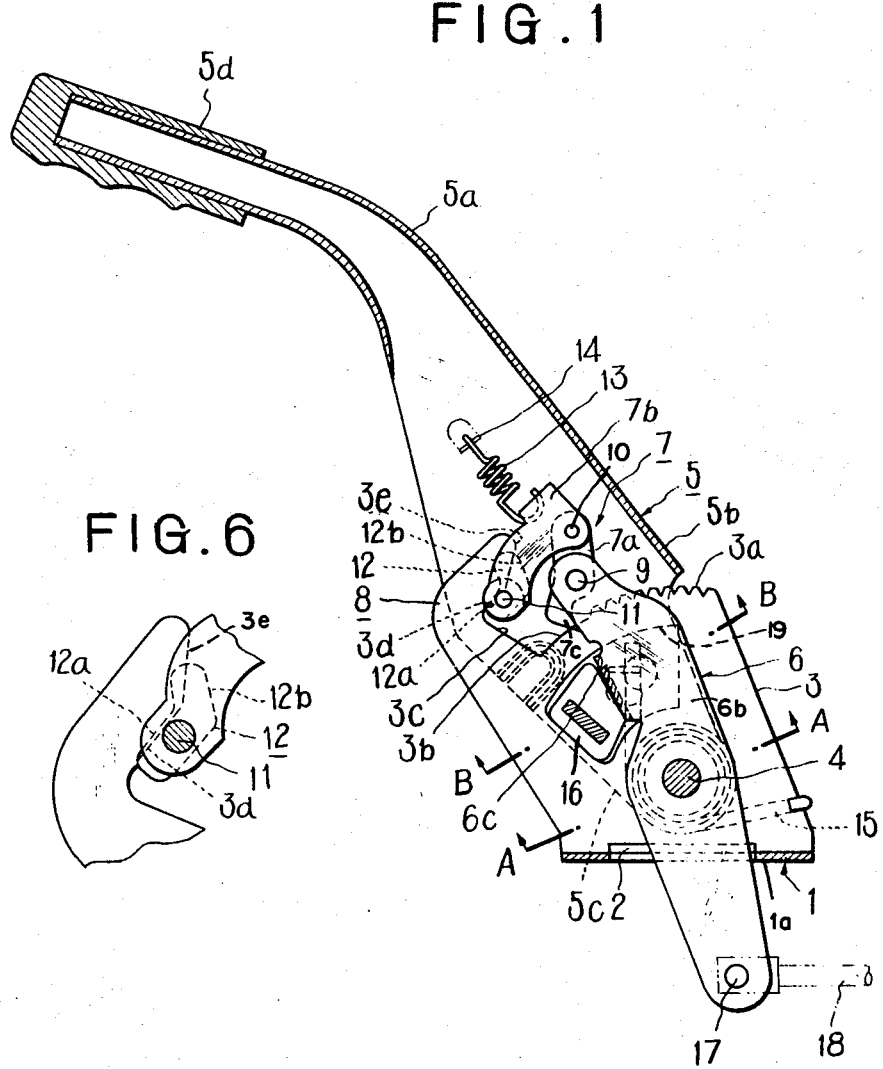

United States Patent

[11] 3,580,104

[72] Inventors Katsuji Yashiro;
Hiroshi Naito, Kanagawa-ken, Japan
[21] Appl. No. 793,768
[22] Filed Jan. 24, 1969
[45] Patented May 25, 1971
[73] Assignee Otsukakoki Kabashiki Gaisha
Yokohama-shi, Japan
[32] Priority July 29, 1968
[33] Japan
[31] 43/052960

[54] CONTROL LEVER FOR PARKING BRAKE SYSTEMS
5 Claims, 6 Drawing Figs.
[52] U.S. Cl. ................................................ 74/535,
74/491
[51] Int. Cl. .............................................. G05g 5/18
[50] Field of Search .................................... 74/535,
533, 491

[56] References Cited
UNITED STATES PATENTS
3,310,995 3/1967 Buchwald.................... 74/535
3,335,621 8/1967 Buchwald.................... 74/535X Primary Examiner—Milton Kaufman
Attorney—Waters, Roditi, Schwartz & Nissen ABSTRACT: The control lever comprises a hand lever pivotably mounted on a fixed ratchet sector and biased to the brake releasing position. A locking lever is pivotably supported on the ratchet sector for connection with a brake mechanism and is pivotably connected to a ratchet piece having a pawl engageable with the teeth on the sector, the ratchet piece in turn being connected to a link engaged in a slot provided in the hand lever. When the hand lever is moved between the brake release position and the brake actuating position, the pawl can travel past the teeth of the ratchet sector by oscillation of the ratchet piece and link as a result of displacement of the pin in the slot. A spring acts on the link to urge the pawl into engagement with the teeth when the hand lever reaches the brake actuating position.

CONTROL LEVER FOR PARKING BRAKE SYSTEMS

This invention relates to a parking brake system for automobiles, and particularly to an improvement in a control lever thereof.

An object of this invention resides in the provision of a control lever for parking brake systems, wherein no specific means is provided to release the locking means which serves to hold said control lever in either one of the aforesaid positions.

Briefly stated, a control lever according to this invention comprises a baseplate, a ratchet sector fixedly secured to said baseplate having a pivot in coaxial relation with respect to a toothed periphery thereof, a lever rotatably supported on said pivot at one end thereof, a locking lever rotatably supported on said pivot at an intermediate portion thereof and being operatively connected to a brake actuating rod at its one end, a ratchet piece pivotably mounted on the other end of said locking lever and having one end of which cooperates with said ratchet sector to control the movement of said lever and said locking lever, and means to lock said ratchet piece in engaged position with said toothed periphery or to disengage the former from the latter through slight movement of said lever in the direction of brake release or brake actuation when said lever occupies the position in which said brake system is actuated.

Figure 2:
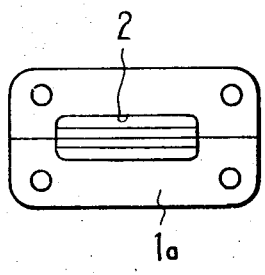
Figure 3:
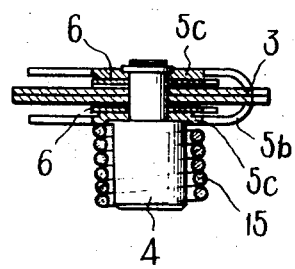
Figure 4:
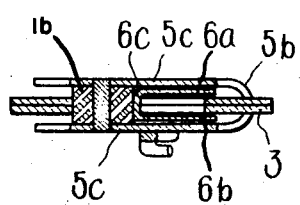
Figure 5:
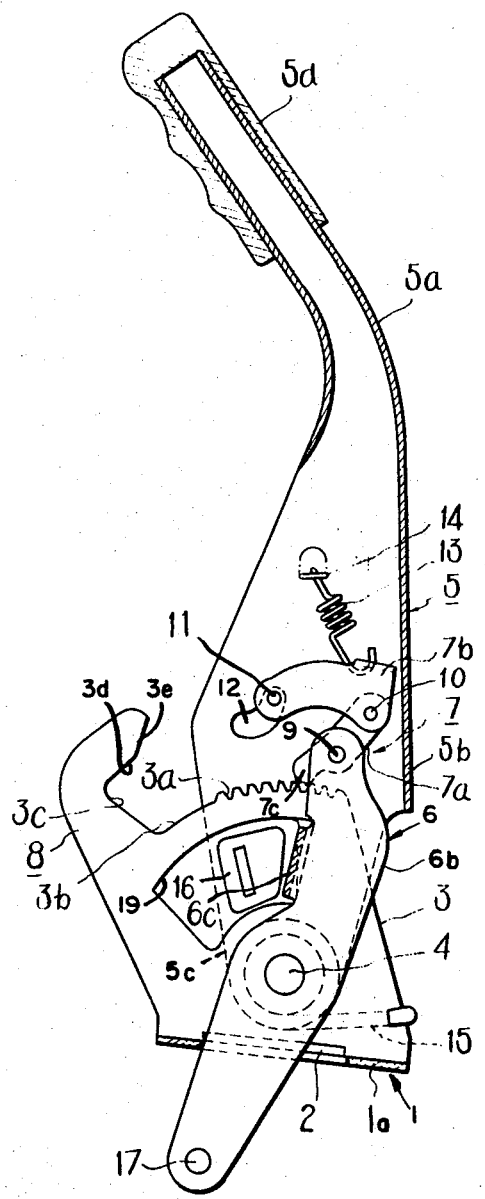

In the drawing,

FIG. 1 shows a preferred embodiment of this invention partly in section in elevation view, FIG. 2 shows a bottom view thereof, FIG. 3 shows a cross-sectional view taken along the line A–A in FIG. 1, FIG. 4 is a sectional view taken along the line B–B in FIG. 1, FIG. 5 shows the embodiment in elevational view with the control lever in the brake actuating position, and in initiation of brake release, and FIG. 6 is a detail view which shows the relation between the cam portion of the ratchet sector and the pin secured in the arcuate link in enlarged scale.

Referring now to FIG. 1 and FIG. 2 of the drawing, a base generally designated as 1 comprises a generally rectangular baseplate 1a having a longitudinal slot 2 therein, which plate 1a may be secured to a car body, and a ratchet sector 3, having a toothed arcuate portion 3a, provided on said baseplate 1a with the lower edge thereof extending along the center of said baseplate 1a. The axis of said ratchet sector 3 is positioned above the upper surface of said baseplate 1a. In this embodiment, base 1 consists of two symmetrical members each forming the split half of said ratchet sector and said baseplate.

Fixedly secured onto said ratchet sector 3 coaxially with the axis of said toothed periphery is a pivot 4 which rotatably supports a brake actuating lever or control lever 5 and a locking lever 6 operatively connected to said lever 5 through a ratchet mechanism generally designated as 7. Details of lever 5, ratchet mechanism 7 and locking lever 6 will be described in the following.

Ratchet sector 3 is provided at its periphery nontoothed portion 3b having a radius equal to the root circle of said toothed portion 3a. At the outer end of said nontoothed portion 3b, a circumferentially inwardly extending generally inverted L shaped portion 8 projects radially outwards. Said portion 8 has a radially disposed side edge 3c and a circumferentially disposed arcuate edge 3d which terminates in an outwardly slanting edge 3e. Said portion 8 will serve as a cam for ratchet mechanism 7 as described later.

Control lever 5 has a tubular portion 5a of relatively small diameter on which a grip 5d is provided, and said tubular portion 5a is bent so as to form an obtuse angle at its intermediate position, wherefrom the diameter of said portion is gradually increased. Said tubular portion 5a terminates in a base portion 5b generally inverted U-shaped cross section.

Each of the sidewalls of base portion 5b, has a longitudinally projecting generally triangular portion 5c opposing one another, which form a support end of said lever 5.

Said lever 5 is rotatably supported on said pivot 4 at said support ends with each of said triangular portions 5c positioned in either side of said ratchet sector 3.

The locking lever 6 is rotatably supported on said pivot 4 with its lower end projected through said slot 2 in said baseplate 1a. Said locking lever 6 comprises two plates 6a and 6b having similar configuration and size. The plates 6a and 6b are joined together at said projecting lower ends, and the remaining parts are spaced apart to form a forklike portion in which said ratchet sector 3 is received. At the other end of said locking lever 6, ratchet piece 7a is disposed between said plates 6a and 6b being rotatably supported thereto at its intermediate portion by a pin 9. The ratchet mechanism 7 includes said ratchet piece 7a whose lower end 7c serves as a pawl which cooperates with said toothed portion 3a of said ratchet sector 3, and an arcuate link 7b connected to the upper end of ratchet piece 7a at one end thereof by a pin 10. The arcuate lever 7b comprises two spaced side plates disposed at each side of said ratchet piece 7a, and a bridge portion which connects said side plates at one end thereof. At the other end arcuate lever 7b, a pin 11 is secured between both side plates. The pin 11 extends through a guide slot 12 provided in each sidewall of base portion 5b. Each end of said pin 11 is enlarged to hold itself engaged within said guide slots.

Each of said slots 12 comprises a circumferential portion 12a and a longitudinal portion 12b which crosses at an obtuse angle. A radial outward edge of circumferential portion 12a is disposed slightly radially outwards with respect to said arcuate edge 3c of the inverted L-shaped portion 8.

The arcuate lever 7b is biased to rotate in the direction towards the grip end of said lever 5 about said pin 11 by a spring 13 secured between a projection 14 provided in said base portion 5b and said bridge portion of said arcuate lever 7b.

A spring 15 is secured between the end portion of said lever 5 and said ratchet sector 3 for biasing said lever to rotate in the direction of a brake release position.

The plate 6a has an abutment 6c at one side which passes through a coaxially disposed arcuate slot 19 provided in said ratchet sector 3. Said abutment 6c terminates at the corresponding side edge of the other plates 6b of lever 6. A bumper member 16, which may be made of rubber or similar material is secured between said triangular portions 5c of lever 5, and passes through arcuate slot 19 in opposing relation to abutment 6c.

Further, the lower end portion of lever 6 projecting through said slot 2 and extending downwardly from said baseplate 1a has an opening 17 which receives an actuating rod 18 for a parking brake system (not shown).

Now the operation of said embodiment will be described. In FIG. 1, the control lever 5 is shown in its brake release position. To actuate the parking brake system, said control lever 5 is pulled towards the driver or rotated in clockwise direction in FIG. 1 against the bias of spring 15. Abutment 6c of the locking lever 6 is pushed by the abutting surface of bumper member 16 to rotate the locking lever 6 in clockwise or brake-actuating direction in FIG. 1. During the rotation of the lever 6 in clockwise direction, the arcuate link 7b and ratchet piece 7a will be held stable with respect to the lever 5 and moved with it keeping substantially the same position relative to the lever 5 as shown in FIG. 1.

As the control lever 5 is moved further, the pawl 7c of said ratchet piece 7a is brought into contact with the toothed portion 3a of said ratchet sector 3. The ratchet piece 7a is urged in counterclockwise direction about its pivot pin 9 on the end of said locking lever 6 in moving along toothed portion 3a. The travel of said ratchet piece is permitted by the oscillating movement of arcuate lever 7b about the pin 11 against the biasing force by the spring 13. During oscillation of the arcuate lever 7b, said pin 11 moves back and forth in said circumferential portion 12a of slot 12. Thus pawl 7c of ratchet piece 7a can pass along the toothed portion 3a of said ratchet sector 3 in the direction of the driver during brake actuation.

The locking lever 6 is rotated with lever 5 by virtue of the abutment of bumper member 16 with abutment 6c. Accordingly, when control lever 5 is rotated, the rod 17 is pulled to actuate the parking brake system.

When the lever 5 is prevented from further movement by the completion of said parking brake actuation, the control lever 5 is released. Then the pawl 7c of ratchet piece 7a biased by the spring 13 against the toothed portion 3a will be engaged with the latter to effect a locking action in the usual manner. Since the lever 5 is urged to rotate in counterclockwise direction by the spring 15, the link 7b will move in clockwise direction relative to the rotating lever 5, causing the pin 11 of the arcuate link 7b to move from the circumferential portion 12a to the top of the longitudinal portion 12b by the action of spring 13 as shown in FIG. 5. In this state, the locking lever 6 and the control lever 5 are both locked by the ratchet mechanism 7 maintaining a gap between the abutment 6c of the locking lever 6 and the bumper member 16 as shown in FIG. 5.

To release the parking brake, the lever 5 is pulled temporarily towards the driver.

Thereupon, said arcuate link 7b is forced to move in the same direction as lever 5 by virtue of the engagement of pin 11 in portion 12b, causing ratchet piece 7a to rotate in clockwise direction about the pin 9 so as to disengage pawl 7c from the tooth of said toothed portion 3a. Thus the brake is released and said locking lever 6 returns to its brake release position with said ratchet piece 7a elevated by the reacting movement from the braking mechanism. With said ratchet piece 7a moved upwardly, the lever 5 is completely free to rotate counterclockwise to its original release position.

At the end of said returning movement, said pin 11 engages the slanting edge 3e in portion 8, and is urged downwardly. By the downward movement of pin 11, arcuate lever 7b is pulled downwardly against the action of spring 13 with the pawl 7c of ratchet piece 7a urged against nontoothed portion 3b of ratchet sector 3. The pin 11 is forced to enter into circumferential portions 12a, and all members of the device return to their original position to become ready for the next brake actuation.

We claim:

1. A control lever for parking brake systems comprising: a baseplate adapted for being fixed to a vehicle, a ratchet sector secured to said baseplate, said ratchet sector having a periphery with teeth thereon, a hand lever pivotably mounted on said ratchet sector, means urging said hand lever to a brake releasing direction, a locking lever pivotably supported on said baseplate for connection with a brake mechanism, means for pivoting the locking lever as the hand lever is moved from a brake release position to a brake actuating position, a ratchet piece pivotably connected to said lockin lever for movement therewith, said ratchet piece having one end engageable with said ratchet teeth on the periphery of said ratchet sector, a link pivotably connected to said ratchet piece at a location remote from said one end, a pin on said link movably supported in a slot provided in said hand lever, and resilient means urging said link away from said ratchet piece, such that during a brake actuating operation, the locking lever will be moved by the hand lever and carry said ratchet piece therewith along said ratchet teeth on the periphery of said ratchet sector and in the brake actuating position, said ratchet piece will engage said teeth, said slot being constructed such that during brake releasing operation, said hand lever in first slightly pulled further in the brake actuating direction to permit movement of the pin in the slot and consequent movement of said link under, the action of said resilient means, to disengage said ratchet piece from said ratchet teeth and thereby enable return of said lever to the brake release position.

2. A control lever as claimed in claim 1 comprising a cam surface on said ratchet plate positioned to engage said pin and displace the same in said slot against the action of said resilient means, in said brake release position.

3. A control lever as claimed in claim 1 wherein said slot is L-shaped with a circumferential portion extending around the axis of pivotal movement of the locking lever relative to said ratchet sector, and a straight portion extending obliquely from the circumferential portion.

4. A control lever as claimed in claim 3 wherein said straight portion is substantially radially oriented to enable the pin to engage therein under the action of the resilient means as the hand lever moves further in the brake actuating direction.

5. A control lever as claimed in claim 1 wherein said locking lever includes two plates forming a fork link portion receiving said ratchet sector.